United States Patent [19]
Woollenweber et al.

[11] Patent Number: 5,906,098
[45] Date of Patent: May 25, 1999

[54] MOTOR-GENERATOR ASSISTED TURBOCHARGING SYSTEMS FOR USE WITH INTERNAL COMBUSTION ENGINES AND CONTROL METHOD THEREFOR

[75] Inventors: William E. Woollenweber, Carlsbad; Edward M. Halimi, Montecito, both of Calif.

[73] Assignee: Turbodyne Systems, Inc., Carpinteria, Calif.

[21] Appl. No.: 08/731,412

[22] Filed: Oct. 15, 1996

Related U.S. Application Data

[63] Continuation-in-part of application No. 08/680,671, Jul. 16, 1996, Pat. No. 5,870,894.

[51] Int. Cl.[6] ............................................. F02B 37/14
[52] U.S. Cl. ............................................................. 60/608
[58] Field of Search ...................................... 60/607, 608

[56] References Cited

U.S. PATENT DOCUMENTS

| | | | |
|---|---|---|---|
| 3,557,549 | 1/1971 | Webster . | |
| 4,745,755 | 5/1988 | Kawamura | 60/608 |
| 4,774,811 | 10/1988 | Kawamura | 60/608 |
| 4,850,193 | 7/1989 | Kawamura | 60/608 |
| 4,878,317 | 11/1989 | Ovens . | |
| 4,878,347 | 11/1989 | Kawamura | 60/608 |
| 4,882,905 | 11/1989 | Kawamura | 60/608 |
| 4,894,991 | 1/1990 | Kawamura | 60/608 |
| 4,901,530 | 2/1990 | Kawamura | 60/608 |
| 4,958,497 | 9/1990 | Kawamura | 60/608 |
| 4,958,708 | 9/1990 | Kawamura | 60/608 |
| 5,025,629 | 6/1991 | Woollenweber | 60/600 |
| 5,038,566 | 8/1991 | Hara | 60/608 |
| 5,088,286 | 2/1992 | Muraji | 60/608 |
| 5,406,797 | 4/1995 | Kawamura | 60/608 |
| 5,560,208 | 10/1996 | Halimi et al. | 60/608 |

FOREIGN PATENT DOCUMENTS

| 3-202632 | 9/1991 | Japan | 60/608 |
|---|---|---|---|

*Primary Examiner*—Michael Koczo
*Attorney, Agent, or Firm*—Brinks Hofer Gilson & Lione

[57] ABSTRACT

A turbocharger system for use with an internal combustion engine includes an assisting motor-generator and control for enhancing turbocharged internal combustion engine performance with reduced losses inherent to turbochargers incorporating waste gates. The controlled assisting motor-generator provides enhanced turbocharger boost with reduced turbo lag below a boost pressure limit, and can generate electric current at high exhaust gas flow rates.

21 Claims, 8 Drawing Sheets

MOTOR-GENERATOR ASSISTED TURBOCHARGING SYSTEMS FOR USE WITH INTERNAL COMBUSTION ENGINES AND CONTROL METHOD THEREFOR

This is a continuation-in-part of U.S. patent application Ser. No. 08/680,671 filed Jul. 16, 1996. U.S. Pat. No. 5,870,894.

FIELD OF THE INVENTION

This invention relates generally to exhaust-gas driven turbochargers and systems for use with internal combustion engines, and more particularly to a turbocharger with an integral electric motor-generator and control for improved engine performance, and electric current generation.

BACKGROUND OF THE INVENTION

Turbochargers are well known and widely used with internal combustion engines for the purpose of increasing power output, decreasing fuel consumption and emissions, and compensating for air density loss during operation at high altitudes. Generally, turbochargers supply an increased charge air supply for the combustion process than can otherwise be induced through natural aspiration by utilizing exhaust gas energy to drive an air compressor. This increased air supply allows more fuel to be burned, thereby increasing power and output not otherwise obtainable from an engine having a given cylinder displacement under natural aspiration conditions. Additional benefits include the possibility of using lower-displacement, lighter engines with corresponding lower total vehicle weight to reduce fuel consumption, and use of available production engines to achieve improved performance characteristics and to accomplish a combination of increased power with reduced fuel consumption.

Some turbocharger applications include the incorporation of an intercooler for removing heat (both an ambient heat component and heat generated during charge air compression) from the charge air before it enters the engine, thereby providing an even more dense air charge to be delivered to the engine cylinders. Intercooled turbocharging applied to internal combustion engines such as diesel engines has been known to significantly increase the power output of a given engine size, in comparison with naturally aspirated engines of the same engine displacement.

Additional advantages of turbocharging include improvements in thermal efficiency through the use of some energy of the exhaust gas stream that would otherwise be lost to the environment, and the maintenance of sea level power ratings up to high altitudes.

At medium to high engine speeds, there is an abundance of energy in the engine exhaust gas stream and, over this operating speed range, the turbocharger is capable of supplying the engine cylinders with all the air needed for efficient combustion and maximum power and torque output for a given engine construction. In certain applications, however, an exhaust stream waste gate, i.e., vent, is needed to bleed off excess energy in the engine exhaust stream before it enters the turbocharger turbine to prevent the engine from being overcharged. Typically, the waste gate is set to open at a pressure below which undesirable predetonation or an unacceptably high internal engine cylinder pressure may be generated.

However, the turbocharged engine suffers an inherent deficiency in that at very low engine speeds, there is insufficient gas energy in the exhaust stream as may be found at higher engine speeds to produce significant levels of air charge pressure, and this energy deficiency prevents the turbocharger from providing a significant and readily available level of boost in the engine intake air system at low engine speeds. As a result, there is appreciable time lag between the time when the throttle is opened for the purpose of accelerating the engine from low speeds, such as idle speed, and when the turbocharger rotor is running fast enough to produce enough air charge pressure (boost pressure) to produce the desired acceleration while eliminating noticeable amounts of smoke when the engine is accelerated. Fuel control devices, such as rack limiters or aneroid controls, have been employed in the prior art to limit the amount of fuel delivered to the engine cylinder until the turbocharger is running fast enough to deliver sufficient air to produce generally smoke-free combustion. However, these fuel limiting devices are known to cause a noticeably slower response to throttle opening (turbo lag), with a corresponding sluggishness in engine and vehicle response.

Turbochargers are capable of very efficient operation at the mass flow and pressure conditions for which they are designed. However, when operated beyond design flow and pressure parameters, the component efficiencies of the turbine and compressor decrease. For example, if a turbocharger is designed and optimized to run at peak efficiency at the maximum speed and load range of a particular engine, then the efficiencies of the turbine and compressor components will likely be compromised at low engine speeds. In order to increase the amount of air delivered to the engine at or below torque peak, the turbocharger turbine is matched to the low engine speed range by decreasing the throat area of the turbine casing to increase the gas velocity entering the turbine wheel. This increases the rotational speed of the turbocharger rotor, but also imposes a higher back pressure in the engine exhaust system which is detrimental to engine performance especially at higher engine speeds and loads.

Specifically, an undesirable consequence of reducing the turbine casing throat area is that the smaller throat area causes the turbocharger rotor to "over-speed" when the engine is run at maximum load and speed and produces an air charge pressure which may exceed design limits due to an excess of exhaust gas energy at high engine speeds and loads. This consequence necessitates the use of a "waste gate" or exhaust gas bypass valve in the exhaust system that vents a portion of the exhaust gas stream outside of the turbine and limits the rotor speed to a fixed value. As a result, the maximum air charge pressure over the high engine speed range is limited to maintain engine cylinder pressures at controlled levels while effectively preventing operation above those constrained levels.

Typically, however, turbochargers are matched to existing engines to have good performance in the middle of the engine speed range, usually at the speed where maximum torque is required and generally not at maximum engine speed and load. Accordingly, this matching procedure also generally requires a waste gate in the exhaust system to prevent turbocharger over-speed at maximum engine speeds and loads in the manner described above. Regardless of how the turbocharger is matched, however, there is still a deficiency in exhaust gas flow at engine speeds below torque peak and at low engine speeds including idle speed.

The turbo lag period and deficiency in performance of the turbocharger at low engine speed and during acceleration can be mitigated and, in many instances, virtually eliminated by using an external power source to assist the turbocharger in responding to engine speed and load increases. One such method is to use an external electrical energy supply, such as energy stored in d.c. batteries to power an electric motor attached to the turbocharger rotating assembly that applies torque to the turbocharger rotor to maintain or increase rotor speed at low engine exhaust flow rates in order to supply sufficient charge air to reduce smoke and emissions during acceleration of the engine.

Turbocharging systems with integral assisting motors are more completely described in our pending U.S. patent applications Ser. Nos. 08/529,672 and 08/680,671, such disclosures being incorporated herein by reference.

Accordingly, there is still a need for an improved internal combustion engine system which improves engine performance, low-speed engine response and reduced emissions characteristics of a conventional internal combustion engine and an improved turbocharging system for controlling and optimizing turbocharged engine performance.

SUMMARY OF THE INVENTION

The present invention overcomes the problems of prior systems and provides improved internal combustion engine and turbocharging systems by providing an internal combustion engine with a motor-generator-assisted turbocharger, and a control system for improving engine performance throughout its operating range.

Systems of the invention preferably include turbochargers, such as those disclosed in Ser. Nos. 08/529, 672 and 08/680,671, which include one or more permanent magnets thereby providing integral assisting motor-generators. The magnets are adjacent motor windings, such as stator windings in a turbocharger bearing housing. Since the permanent magnets of the motor are secured to the turbocharger rotating assembly, the assisting motor-generator can be operated in an assisting mode and produce torque to supplement the available exhaust gas energy in accelerating the rotor up to a given rotor speed. According to the present invention, the system can be so designed that the assisting motor torque reaches zero value at or about the torque peak speed of the engine when the turbocharger is running at peak efficiency. An electric control system is employed to allow the assisting motor to supply torque to the turbocharger rotor over the low engine speed range, and the electric control system can switch to a generator mode over the high engine speed range. Through the use of such a control, the amount of power generated by the assisting motor can be matched to the excess exhaust gas energy necessarily provided at the high engine speed range so that a constant boost level can be maintained in the air intake system. Accordingly, one important benefit of the present invention is the elimination of the conventional waste gate thereby mining or eliminating the inefficiencies of prior systems directly related to the unharnessed and wasted exhaust gas flow. Furthermore, when the assisting motor-generator is producing electric current from the excess exhaust gas energy as the engine is running at high speeds in the generator mode, the regeneration current can be fed into the vehicle electric system for the purpose of charging the batteries and the assisting motor-generator can provide a braking action to the turbocharger rotor. Thus, the assisting motor can take current from the batteries when boost needs to be augmented over the low engine speed range and can feed current back into the batteries over the high engine speed range when there is a need to limit the maximum turbocharger speed and when there is excess energy available in the engine exhaust gas stream.

Accordingly, the improved turbocharger and controller system of the present invention can combine the elements of a rotary electric machine and a turbocharger in an optimal integrated design that can maximize the torque applied to the turbocharger rotor and can minimize any compromise in the turbocharger basic design configuration, with an electric controller that can eliminate the waste gate of prior art systems, thereby improving engine performance and operating efficiency, and decreasing engine emissions.

Further features and advantages of the invention will be apparent from the drawings and more detailed description that follows.

DETAILED DESCRIPTION OF THE PREFERRED EMBODIMENTS

Figure 1:
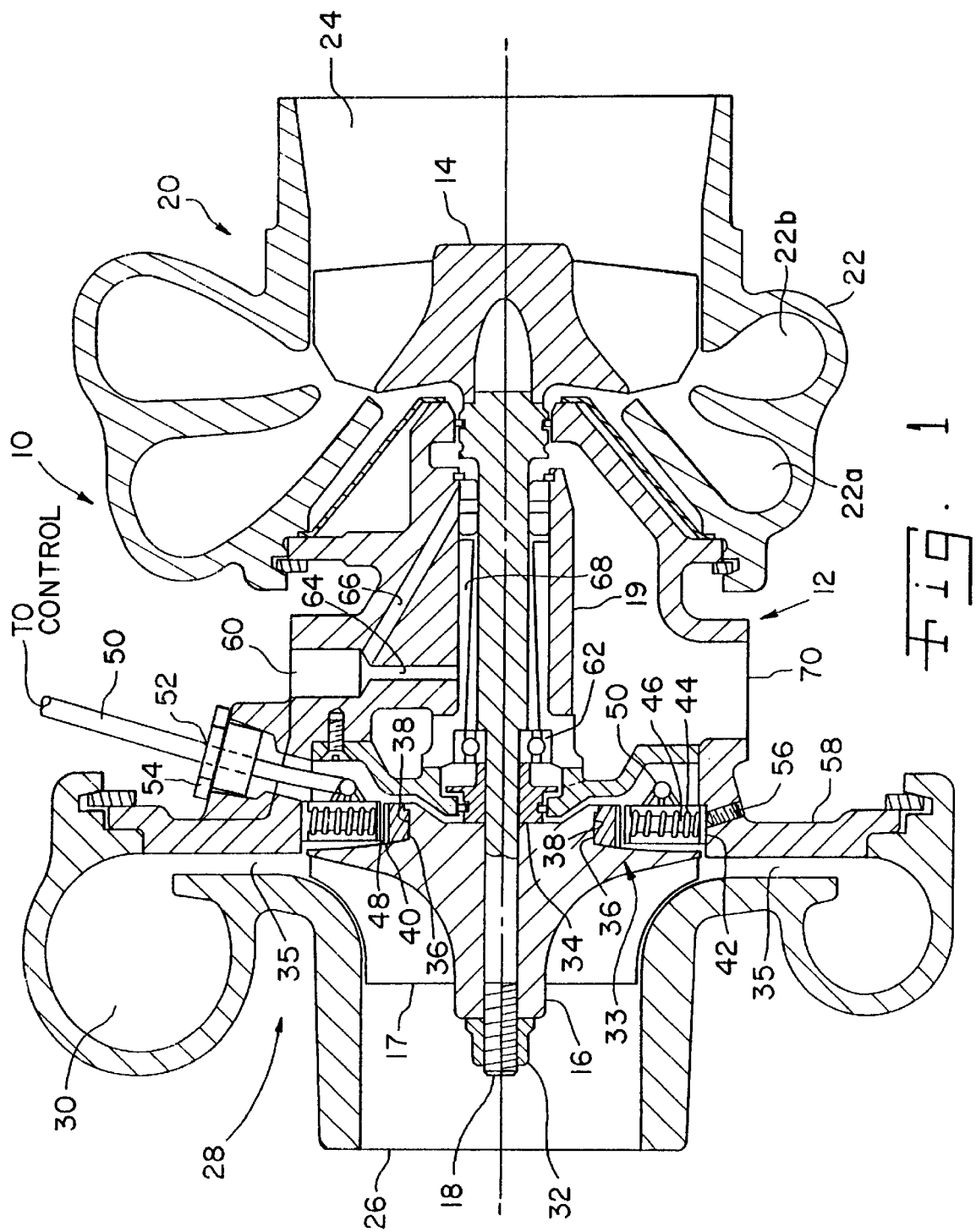
FIG. 1 is a cross-sectional view of one embodiment of the turbocharger apparatus of the present invention taken at a plane through the longitudinal axis of the main shaft of the turbocharger.

Preferred embodiments of the invention include a turbocharger with an internal assisting motor-generator, which can be embodied in a number of configurations. Referring now to the drawings, and particularly to FIG. 1, turbocharger 10, for example, combines the elements of a rotary electric machine and a turbocharger in the invention.

The turbocharger 10 is, except for the internal motor-generator elements of substantially conventional design, structure and size. The turbocharger 10 includes a turbine housing or casing 12 for supporting a multi-vaned exhaust gas turbine wheel 14 and an air charging compressor wheel 16 having a plurality of vanes 17 mounted on the opposite ends of a common connecting shaft 18. The turbine 20 includes a turbine housing 12 which has an exhaust stream inlet scroll 22 that is connected to receive exhaust gas from an internal combustion engine which in some applications has an exhaust manifold divided into two sections 22a, 22b, each section receiving exhaust gas from a different set of engine cylinders (not shown). The exhaust gas is directed and drives the turbine wheel 14 and shaft 18 in rotation. After passing through the turbine wheel 14, the exhaust gas stream flows out of the turbocharger through an exhaust vent 24.

Rotation of shaft 18 secured in bearing housing 19 rotates the attached compressor wheel 16 at the opposite end of the connecting shaft 18, and combustion air is drawn in through an air intake opening 26 formed in a compressor casing 28 after passing through an appropriate filter (not shown) to remove contaminants. The compressor casing 28 includes a scroll 30 for directing the compressed combustion air to an engine intake manifold (not shown). The compressor wheel 16 is secured on the rotating shaft 18 between a lock nut 32 and a sleeve 34 in the bearing housing 19. The in-flowing combustion air is compressed by the driven compression wheel vanes 17, which are formed on a front face of the compressor wheel 16. After being compressed by the compressor wheel 16 and passing through a diffuser section 35, the compressed combustion air is directed through the inlet scroll 30 and is delivered to the intake manifold system (not shown) of the engine.

Figure 2:
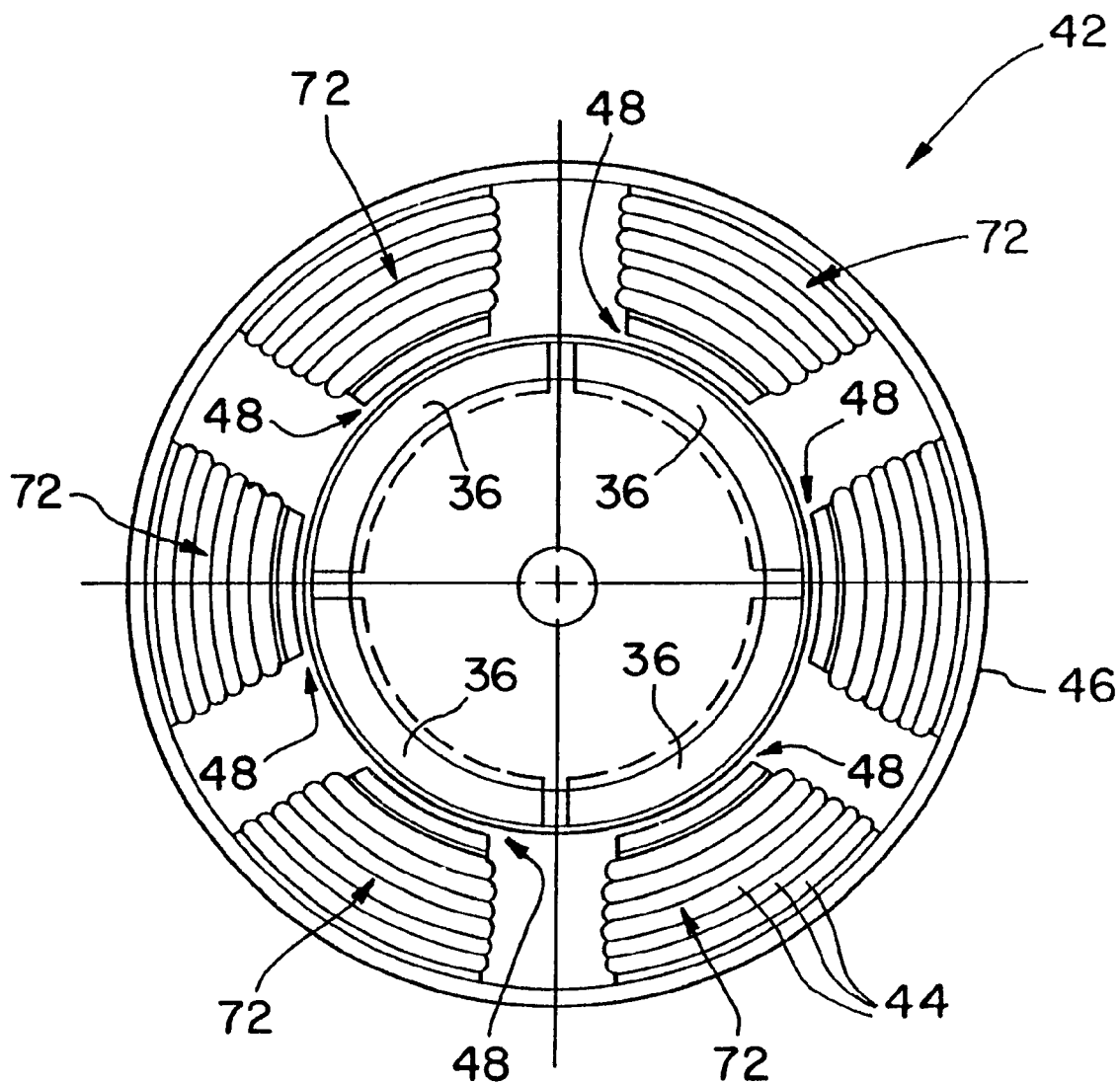
FIG. 2 is an elevational view of a stator configured to be received radially outwardly of the compressor wheel magnets in the turbocharger shown in FIG. 1.

FIGS. 1 and 2 show one preferred embodiment of an internal motor-generator/turbocharger assembly of the invention. As shown, for example, in FIG. 1, in such an internal motor-generator 33 a plurality of magnets 36 are mounted in a generally circumferential arrangement about the back face of the compressor wheel 16 at a constant radial offset from the connecting shaft 18, although it is contemplated that such arrangement may be staggered or otherwise repositioned in machines of the invention for better balancing, inertia, generated torque and the like. In this embodiment, the magnets 36 are mounted to a circumferential shoulder or ledge 38 formed in the back face of the compression wheel 18, and are retained in place against centrifugal and axial forces by a circumferentially extending steel retention sleeve 40.

A motor winding such as a stator winding 42 consisting of an electrical conductor such as copper wire 44 wound around a laminated steel core 46 is located in the bearing housing 19 of the turbocharger 10, and extends radially outwardly of the magnets 36 secured to the compressor wheel 16. An air gap generally indicated at 48 is provided between the steel retention sleeve 40 and the inner diameter of the motor winding 42 to provide necessary running clearance and prevent any physical contact therebetween.

The wires 44 of the motor winding 42 extend to connecting wires 50 which terminate at location 52 (shown out of plane), where they exit from the center housing through a sealed fitting 54, and are thence led to a control and power supply (e.g., such as in FIGS. 8 and 9 as described further below). The sealed fitting 54 encapsulates the connecting wires 50 to prevent ingress of moisture and contaminants. The motor winding 42 is retained in an orientation coaxial with the connecting shaft 18 by one or more set screws 56 which extend through an outwardly extending segment 58 of the bearing housing 19 and engages with the outer circumference of the motor winding 42.

In the invention, when the stator, i.e. motor winding 42, is energized by the control and power source (e.g., FIGS. 8 and 9), torque is applied to the compressor wheel 16 by the magnets 36 and augments the torque being applied to the connecting shaft 18 by the exhaust turbine 14, causing the rotating assembly of the turbocharger to turn faster than if it were not operated in accordance with the invention. The faster rotation of the compressor wheel 16 allows it to supply the engine with a greater flow of air at higher pressure at any engine speed, thereby improving engine performance while reducing the amount of smoke and pollutants emitted during acceleration of the engine.

It will be apparent to the skilled artisan that the additional components of the turbocharger not discussed in detail are well known in the art, including shaft bearings housed in the bearing housing 19 and oil sealing elements necessary for reliable support of the rotating assembly and for containment and filtration of the lubricating oil that is conventionally supplied from a pressurized oil system to lubricate and cool the bearings. For example, an oil stream enters the center housing at oil inlet 60 and, after passing through the bearing system, including, for example, ball bearing 62 and oil conduits 64, 66, 68, flows to oil drain 70 and is then conveyed back to the engine oil sump (not shown).

With reference now to FIG. 2, the motor winding, i.e., stator 42 includes a plurality of laminations 46 of suitable, magnetically permeable material. The laminations 46 of the stator 42 are formed to define six poles, each carrying a pole winding 72 of copper wire 44 which is electrically connected outside of the laminations and which can be progressively energized to create a rotating magnetic field around the outside of the magnets 36. The resulting rotating magnetic field couples with the magnetic field of the magnets 36 attached to the compressor wheel 16 to assist rotation of the turbocharger especially at low engine speeds.

Figure 3:
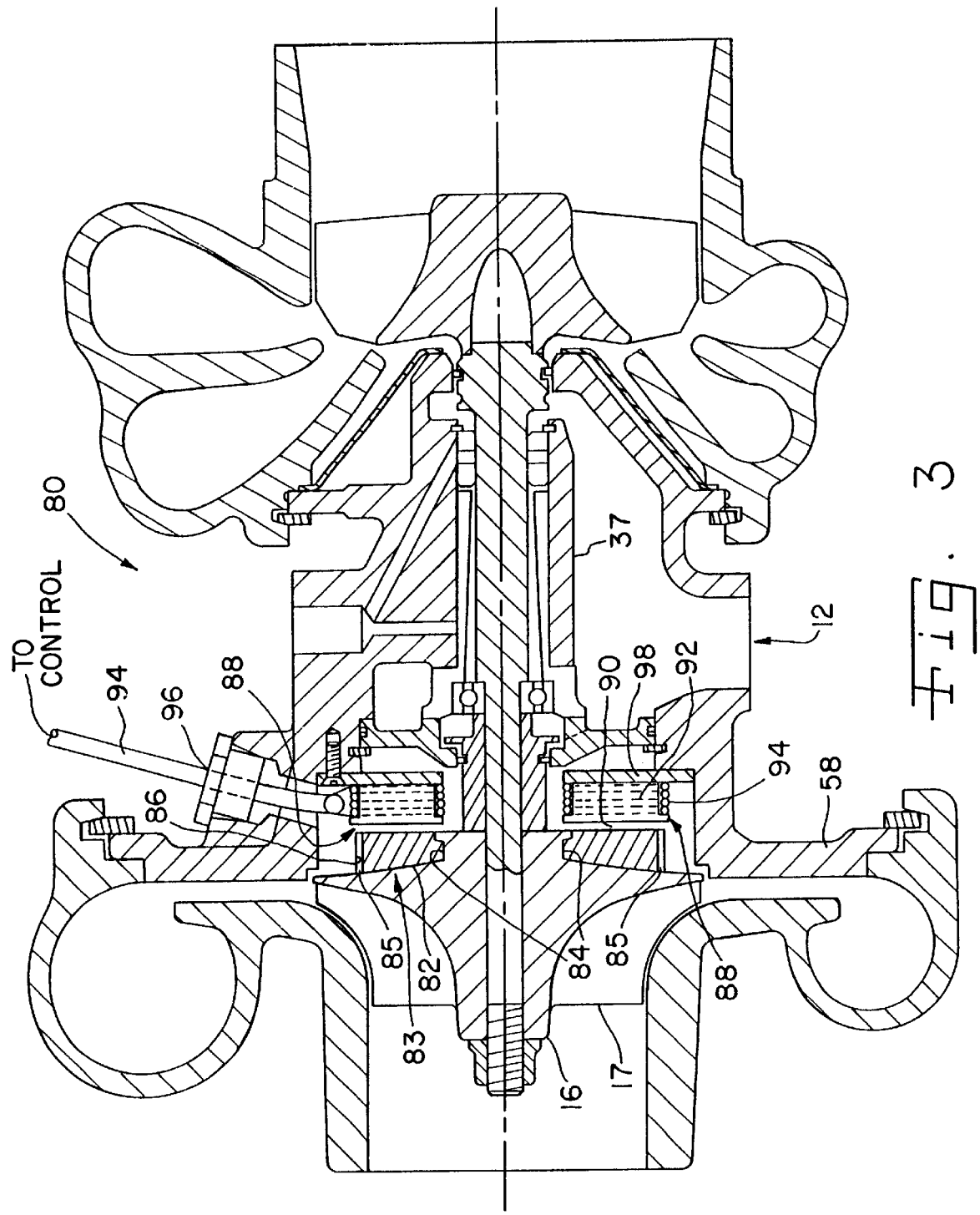
FIG. 3 is a cross-sectional view of another embodiment of the turbocharger apparatus taken at a plane through the longitudinal axis of the main shaft of the turbocharger, showing the stator mounted in an axially offset orientation relative to the compressor wheel magnets.
Figure 4:
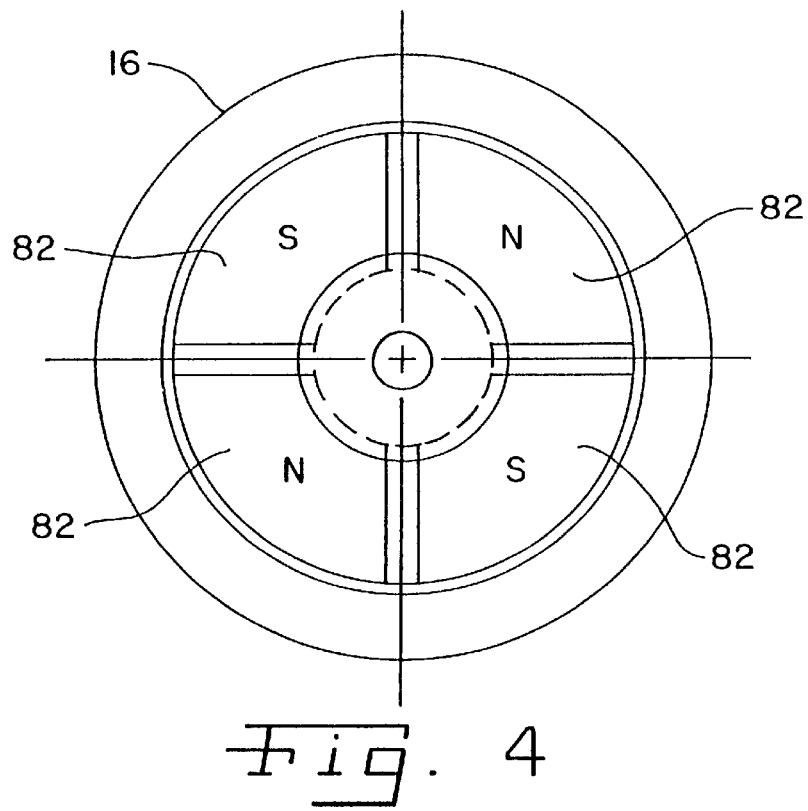
FIG. 4 is an elevational view of the compressor wheel of FIG. 3 showing the motor magnets secured to the compressor wheel.
Figure 5:
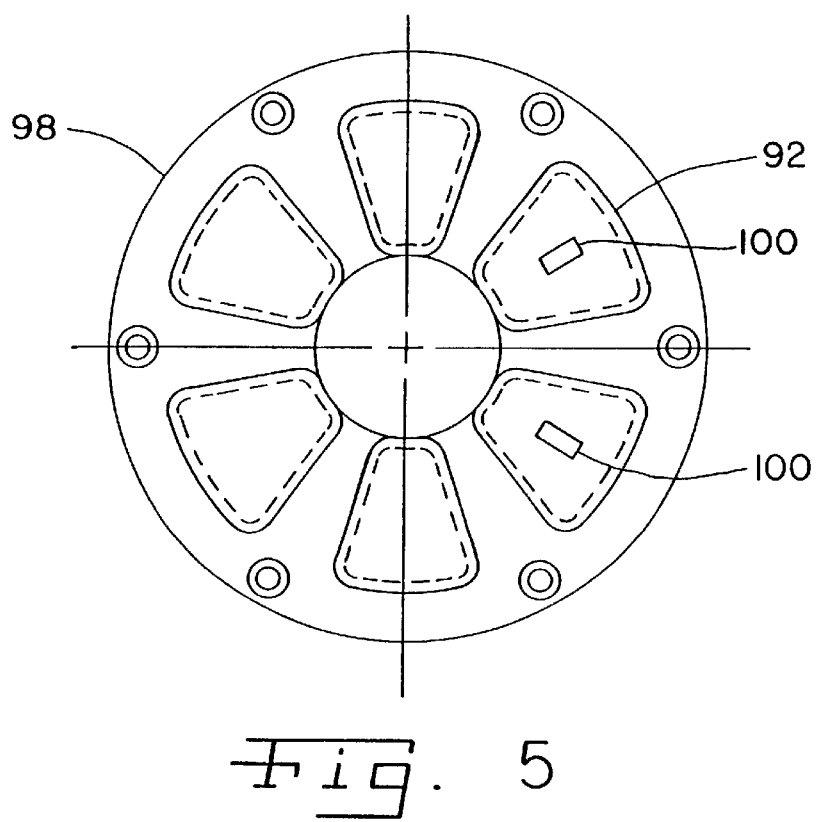
FIG. 5 is an elevational view of the motor windings secured to a face plate to be attached to the turbocharger housing adjacent to the motor magnets.

FIGS. 3, 4 and 5 show a second embodiment 80 of a turbocharger of the invention including an internal motor-generator 83. The second embodiment 80 includes a plurality of magnets 82 which have a larger dimension in the radial direction extending from a shoulder 84 formed at a radially intermediate location on the back face of the compressor wheel 16. More particularly, the magnets 82 of the second embodiment extend a greater radial height into an annular space defined between the shoulder 84 and an inner surface 86 of housing portion 58. A stator 88 is supported in the bearing housing 37 in opposing, axially offset relationship to the motor magnets 82. A retention sleeve 85 secures the magnets 82 to the compressor wheel 16 against centrifugal and axial forces in the manner previously described. The remaining components of the turbocharger shown in FIG. 3 are substantially the same as those shown in FIG. 1 and perform the same functions as previously described.

Mounting of the magnets with the windings axially offset from the motor magnets 36 as shown in FIG. 3 allows for the use of larger magnets having an increased dimension in the radial direction along the back face of the compressor wheel. Larger magnet sizes corresponds with larger torques which can thus be exerted on the compressor wheel 16 as compared with the embodiment shown in FIG. 1. However, the embodiment shown in FIG. 3, which utilizes an axially-offset stator, contributes additional axial space in the interior of the bearing housing 19 and lengthens the overhang of the compressor wheel 16 from the compressor and bearings.

Again referring to FIG. 3, the stator 88 is positioned adjacent to the magnets 82 with a small air gap 90 therebetween. The windings of the stator 88 include six laminated cores 92 around which copper wire 94 is wound in one or more layers. The connections to each wire 94 are led to a single location and exit the bearing housing 37 through a sealed fitting 96, and are available for connection to a control and power supply (e.g., such as in FIGS. 8 and 9 as described further below). The magnets 82 attached to the back face of the compressor wheel 16 may be arranged, for example, according to an embodiment having four magnets 82 as shown in FIG. 4; however, a greater or lessor number of motor magnets 82 and a greater or lesser number of stator poles may be used with this turbocharging system. According to the embodiment shown in FIG. 4, the four magnets 82 are arranged in alternating north-south polarity on the back of the compressor wheel 16 adjacent the stator and are electrically isolated from one another.

FIG. 5 shows a front view of the laminated magnetic cores 92 provided on a face plate 98, which is attached to the bearing housing 37 of the turbocharger. One or more Hall effect sensors 100 affixed to the assembly and preferably at a centered location on one or more laminated magnetic cores 92 are used to detect the position of the magnets 82 (FIG. 4) on the rotating member and to send a signal to the control (e.g., such as in FIGS. 8 and 9 as described further below), for indicating turbocharger rotor speed and when each one of the separate winding fields is to be energized.

Figure 6:
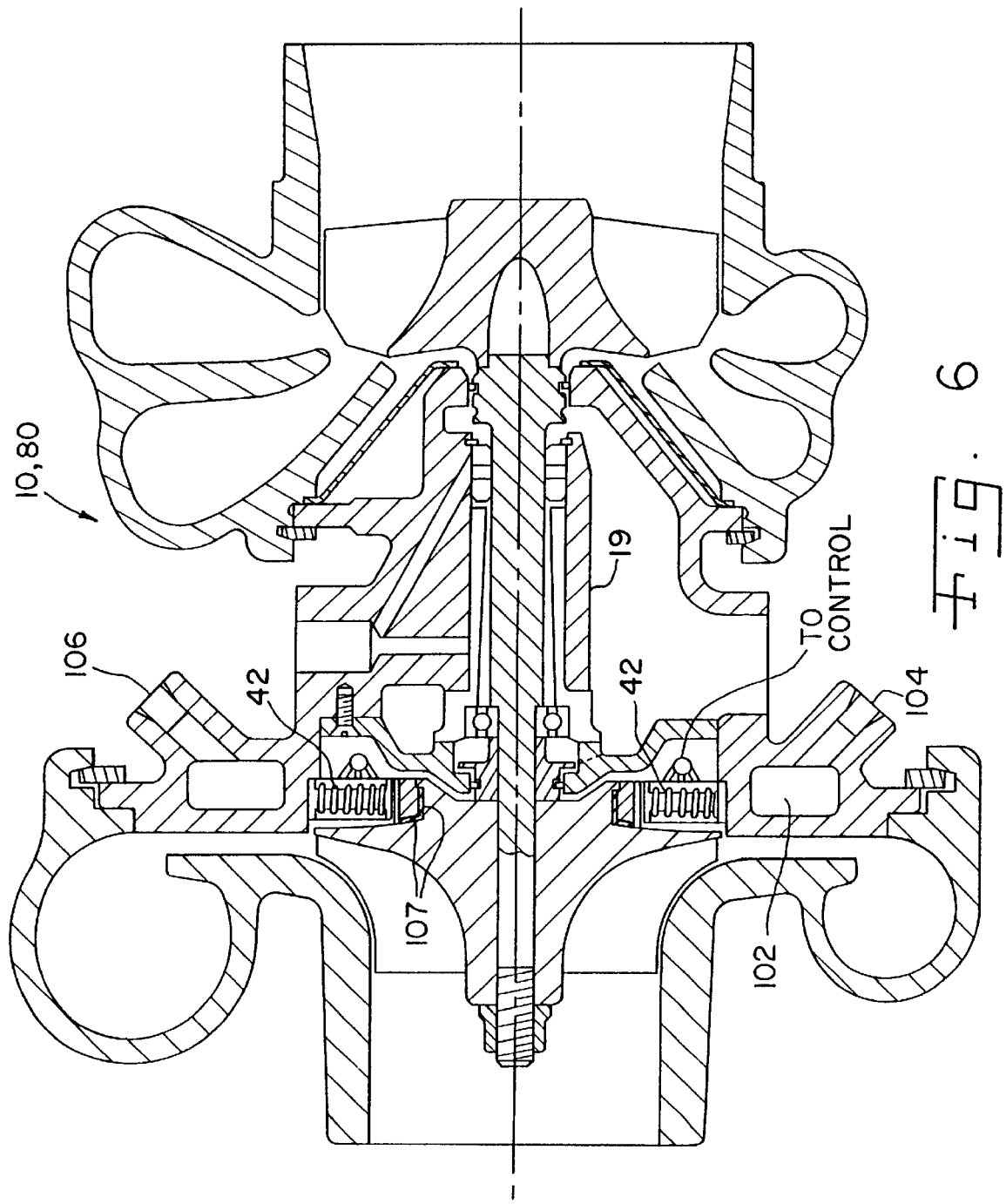
FIG. 6 is yet another embodiment of the turbocharger apparatus taken at a plane through the longitudinal axis of the main shaft of the turbocharger, showing a water jacket integrally formed in the center housing thereof for receiving an engine coolant flow.

As previously described, the motor magnets of either turbocharger embodiment 10 or 80 remain relatively cool by virtue of being attached to the rotating compressor wheel of the turbocharger and can be insulated therefrom. The compressor wheel takes in air at ambient temperature and the temperature rise due to the compression process takes place well outboard from the location of the magnets on the back of the compression wheel. However, the windings may be cooled by including a coolant flow path integrated into the turbocharger bearing housing, for example, the bearing housing 19 of FIG. 1, as shown in FIG. 6. More particularly, cooling water from the engine cooling system can enter the water jacket 102 at inlet 104, circulate through the water jacket 102, and exit at outlet 106. The cooling jacket 102 extends to and through significant heat sink zones in the heat transfer relationship with the stator winding 42 within the turbocharger housing. Cooling fluid circulation may, of course, be independent of the cooling system for the internal combustion engine to which the turbocharger of the present invention is affixed.

Performance of the turbocharger of either embodiment 10 or 80, or an external motor-generator, under command of the electric controller of the present invention is shown on a boost pressure versus engine speed curve of an exemplary turbocharged diesel engine, shown in FIG. 7, and as further shown in FIGS. 8 and 9, controllers 144, 182 control assisting motor-generators 146, 164 of turbocharger assemblies 142, 162, the operations of which will be further described hereinbelow.

As indicated above, turbochargers of the invention may include one or more sensors (e.g., 100) that can output turbocharger rotor speed as a signal to the assisting motor-generator control 144, 182. The motor-generator control 144, 182 can include, or be programmed to include, when it includes a microprocessor, means to convert turbocharger rotor speed into engine speed. The control may, in addition or in the alternative, be provided with an engine speed signal from the engine tachometer and/or an engine manifold pressure signal, or other usable engine parameter signals (indicated in FIGS. 8 and 9 by dashed lines 145 and 165) and may use such engine signals to energize, de-energize and load through connection with an electric current load, the assisting motor-generator as described below.

At a low idle speed of about 600 RPM, a turbocharger of prior art systems would be incapable of producing significant boost pressure due to the low temperature and low quantity of exhaust gas flow, as shown by the solid performance curve 130. At engine speeds in excess of about 1400 RPM, i.e., at full load, the turbocharger would over-speed and without a waste gate, produce boost pressures above an allowable limit (shown as an exemplary boost pressure of about 45 inches Hg), as indicated in the alternating long-short dash line 134 of FIG. 7. However, with a boost pressure controlled waste gate operating at or about the allowable boost pressure limit (e.g., 45 inches Hg), the turbocharger boost is limited to the allowable limit, as shown by the solid line 130. The waste gate, however, undesirably wastes energy above that limit by venting the exhaust gas stream around the turbocharger turbine and out the exhaust pipe.

According to the present invention, however, a turbocharger with an assisting motor-generator can provide the engine with an ideal boost curve over the entire engine speed range up to a rated speed of 2000 RPM for an exemplary diesel engine (and at higher or lower engine speeds for other diesel engines and other types of internal combustion engines). The assisting motor-generator, for example, the internal motor-generators 33 or 83 of the embodiments described above, act as motors and assist the turbocharger to rotate at a predetermined minimum speed at idle and up to the intermediate torque peak speed of 1400 RPM, as shown by the dashed line 132. Above the intermediate torque peak speed of 1400 RPM, the assisting motor-generator, e.g., 33 or 83, acts as a generator, braking the turbocharger at speeds above 1400 RPM in order to maintain a substantially constant boost pressure, as shown by the dashed line 132, at the allowable boost pressure limit, without venting otherwise useful waste stream energy as required by the prior art. The excessive boost pressure from an unassisted turbocharger over-speed without waste gate venting is shown by the alternate long-short dashed curve 134, which extends from performance curve 130 at boost pressures above the boost pressure limit.

Figure 7:
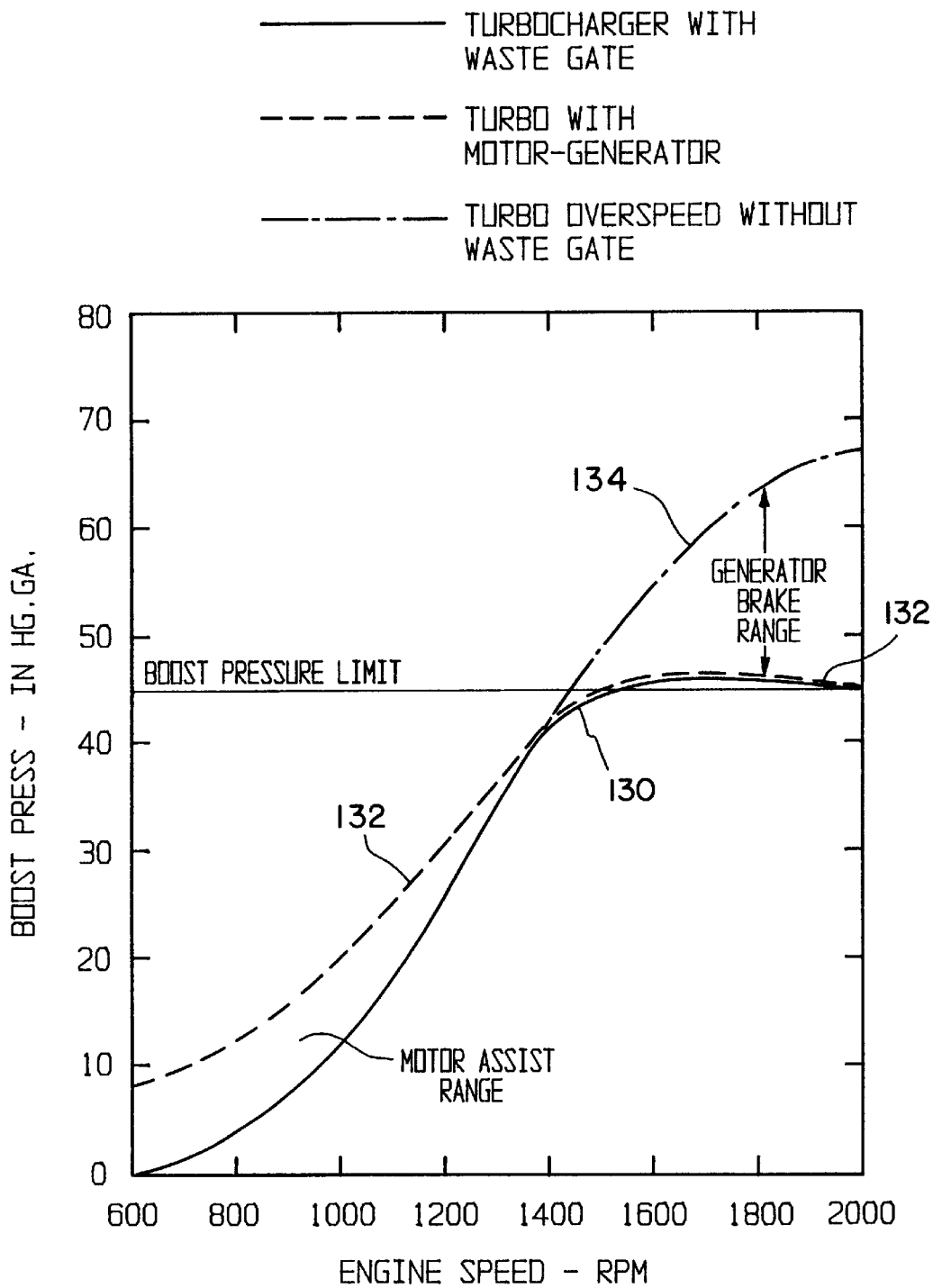
FIG. 7 is a graphical representation of boost pressure versus engine speed of the turbocharging system and controller of the present invention, charted against overboost losses of a prior art turbocharger provided with a waste gate.

The assisting motor-generator, for example, the internal motor-generators 33 or 83 of the embodiments described above, may be designed to rotate the turbocharger at a desired maximum rotor speed when the full voltage of the internal combustion engine battery (e.g., 150 or 168 of FIGS. 8 and 9) is applied to the assisting motor-generator by a controller, and when the turbocharger rotor is being urged by the engine exhaust gas energy to higher speeds (e.g., at engine speeds in excess of 1400 RPM in the example of FIG. 7). The assisting motor-generator can generate current for an electric load, for example, in recharging the internal combustion engine battery and act as a brake for turbocharger rotor rotation. Generator braking as a result of the invention is shown as the difference in boost pressure between curves 132 and 134 for engine speeds in excess of 1400 RPM. FIG. 7 is exemplary of one result of the invention. The motor torque and generator output of the assisting motor-generator may be tailored by the control means to produce other boost versus engine speed characteristics, according to the requirements of different kinds of engine applications.

One very desirable operational mode can be produced by operating the assisting motor-generator (e.g., 33 or 83) at low engine speeds at a first level of energization for assisting the turbocharger maintain a predetermined speed level to produce boost, then raising the level of energization for short periods of time when the engine is called upon to accelerate from low to higher engine speeds. In this manner, the assisting motor-generator can produce a torque much higher than the first level for the purpose of increasing the boost pressure provided by the turbocharger during engine acceleration, thereby lowering exhaust smoke, lowering exhaust emissions, shortening acceleration time, and improving engine response to sudden load changes. It will be appreciated that the present invention is not limited to diesel engines, and can be applied to any type of internal combustion engine having an exhaust gas flow.

Many other desirable operational characteristics are possible by utilizing the appropriate electric controls to vary the motor torque and the generator braking effect. With reference again to FIGS. 8 and 9, control systems for operation of two-stroke and four-stroke internal combustion engines are shown; those control systems providing enhanced operational control with all of the above-described benefits.

Figure 8:
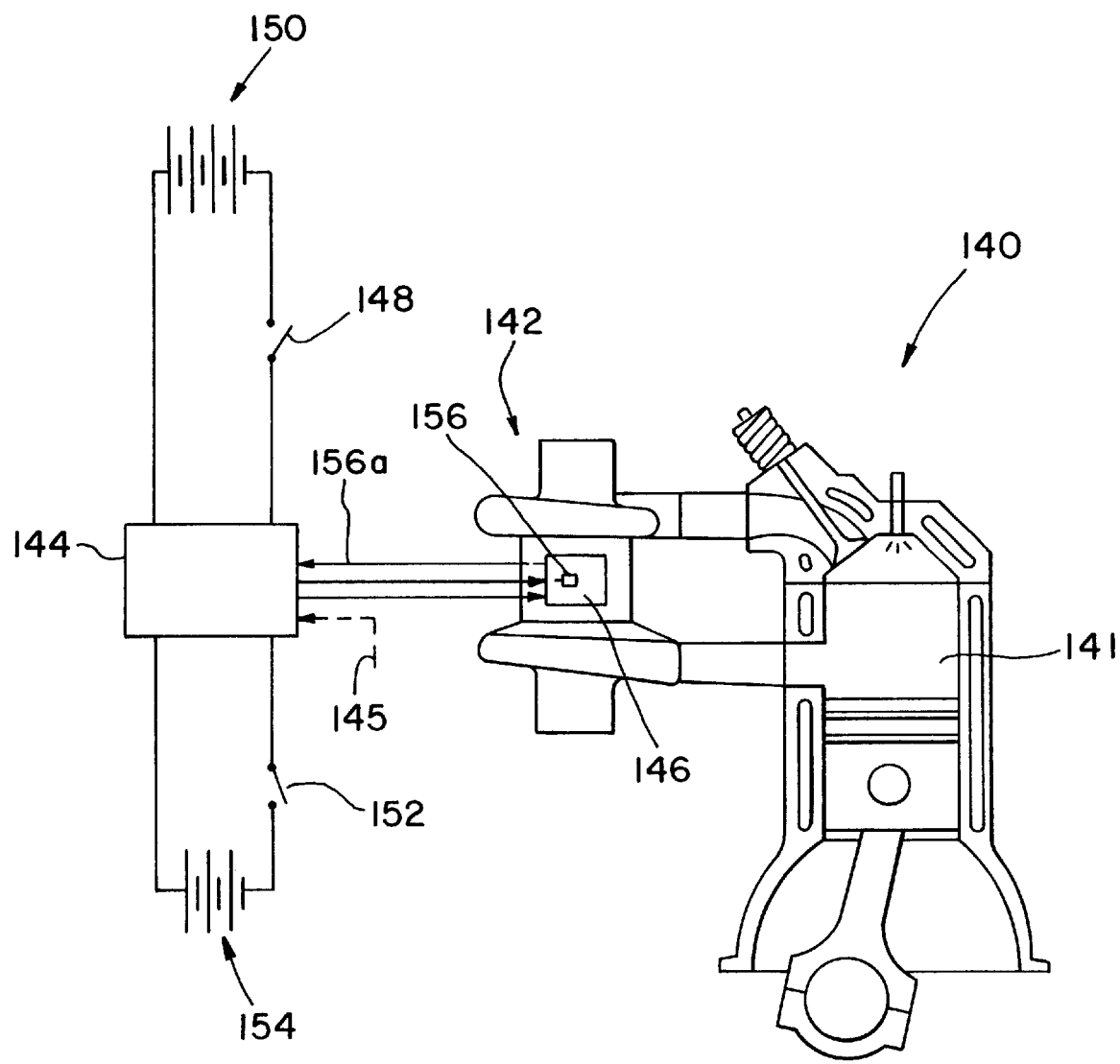
FIG. 8 is a schematic view of a control system of the present invention for a two cycle engine according to one embodiment of the invention.

More particularly, and with reference to FIG. 8, in the case of a two-cycle internal combustion engine shown schematically as numeral 140, the engine does not have a suction stroke and cannot be started unless a compressor is employed to force combustion air into a cylinder 141 during cranking. With a motor-assisted turbocharger system of the present invention, the assisting motor can be energized when the engine is being turned over by a starting motor and the turbocharger rotor can be rotated by the assisting motor at a sufficiently high enough speed to provide a positive boost pressure in the intake manifold system. Thus, the need for a separate engine-driven compressor to provide boost pressure for starting is eliminated along with the complication of its associated mechanical drive system resulting in savings of weight and system complexity.

FIG. 8 shows a first embodiment of a control system of the present invention applied to a two-cycle engine with a motor-assisted turbocharger 142. The control system includes an electric controller 144 which is operatively connected for supplying energizing current to an assisting motor 146 for the turbocharger. An ignition switch 148 is closed when the two-cycle engine 140 is to be stared, thereby energizing the assisting motor 146 by energy source 150 to accelerate the turbocharger rotor up to a minimum continuous operating speed which enables the engine 140 to start and run at light loads. When a gas pedal, throttle linkage, or transmission lever (not shown) is moved to rapidly accelerate the engine and/or vehicle, a "throttle" switch 152 closes and energizes a super-energy source 154 which supplements energy source 150 to super-energize the assisting motor 146 to aid in the acceleration of the turbocharger rotor and hence, provide improved acceleration of the engine. The "throttle" switch 152 may be provided with a dashpot operator so that the "throttle" switch is closed only if the engine's throttle is moved rapidly.

A rotor speed sensor 156 for the turbocharger 142, which may be located adjacent to or within an integral electric motor in the turbocharger 142, can send a rotor speed signal 156a to the controller 144 to open both energizing circuits 150, 154 of the motor 146 when the rotor speed exceeds a predetermined high level, at which time the turbocharger 142 is capable of producing a boost pressure higher than the exhaust pressure, thereby sustaining engine operation. At any subsequent time, when the turbocharger rotor speed falls to a level where the turbocharger can no longer sustain engine operation, the rotor speed signal can be used by the controller 144 to energize the assisting motor 146 at its minimum continuous level, and the assisting motor 146 can assist the turbocharger to maintain a rotor speed necessary to keep the engine operating. At any time when the engine acceleration is needed, the throttle switch 152 closes the super-energizing circuit 154 to again assist the turbocharger and engine to accelerate. At any time when the rotor speed exceeds the predetermined high level such as that corresponding to the boost pressure limit (FIG. 7), the rotor speed signal 156a is used by the controller 144 to open both energizing circuits 150, 154. If desired, in addition or in the alternative, one or more engine operating signals 145 may be provided to control 144 to effect such operations.

Figure 9:
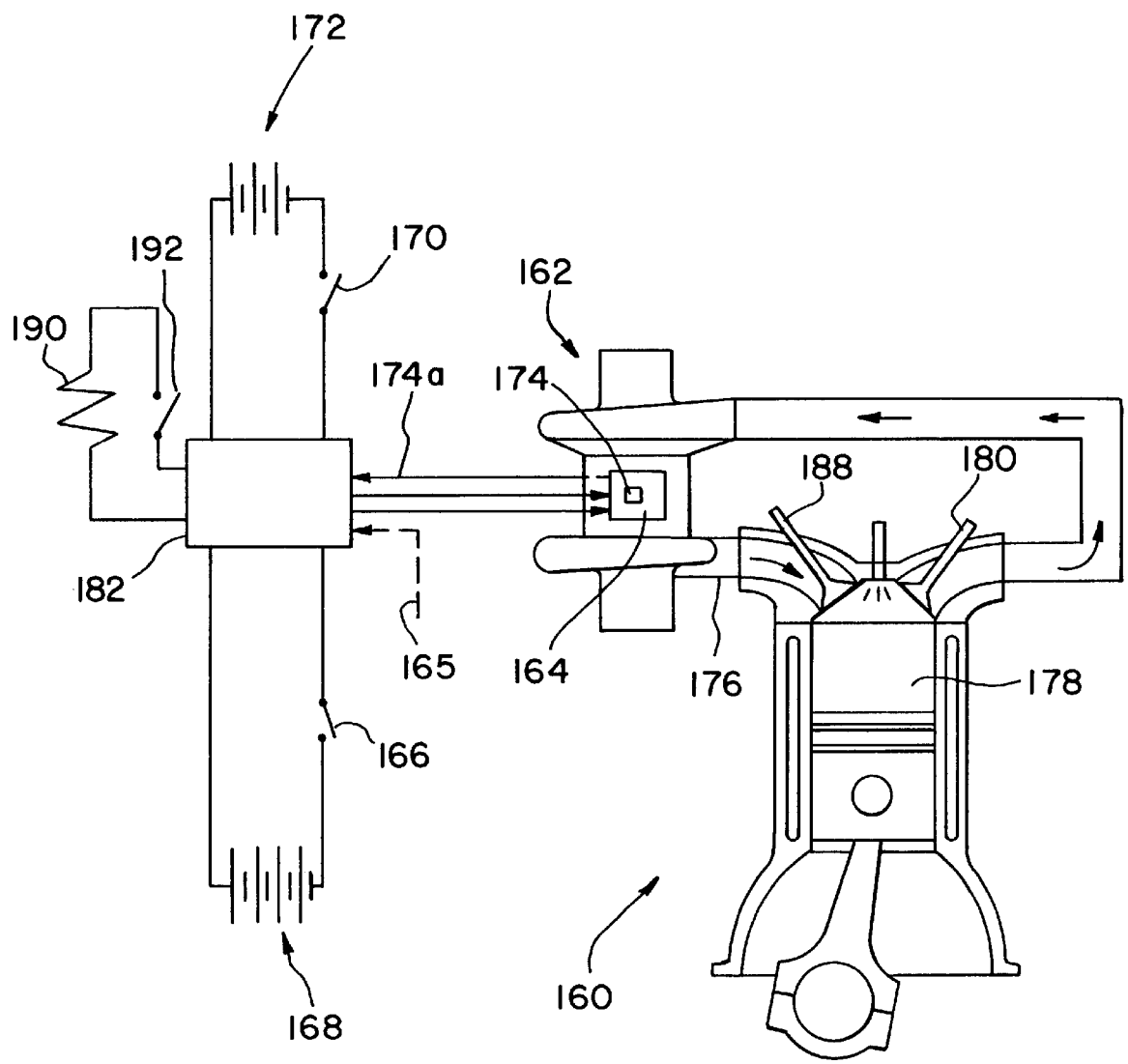
FIG. 9 is a schematic view of a control system of the present invention for a four cycle engine according to another embodiment of the invention.

FIG. 9 shows another embodiment of a control system of the invention applied to a four-cycle engine shown schematically as numeral 160 using a motor-assisted turbocharger 162 controlled by a controller 182 as described below. Unlike a two-cycle engine, a four-cycle engine includes a suction stroke and does not need an ancillary compressor to generate engine charge air. Thus, a four-cycle engine can be started without the assistance of the turbocharger assembly 162.

In the system of FIG. 9, when it is desired that the engine 160 is to be accelerated under load, for example, to move a loaded vehicle, the vehicle transmission lever is advanced to the drive position in the case of an automatic transmission, or in the case of a manual transmission, the appropriate gear is selected and engaged. This action closes a transmission switch 166 which activates through controller 182 continuous operation of the assisting motor for the turbocharger (e.g., 164) by energizing it from continuous energy source 168, such as the internal combustion engine battery. This prepares the engine for its first acceleration by increasing turbocharger rotor speed to a predetermined minimum speed. Then, when the vehicle gas pedal or throttle (not shown) is rapidly operated, e.g., for rapid vehicle acceleration, a "throttle" switch 170 is closed and, through controller 182, the assisting motor 164 is super-energized by a super energy source 172 for assisting the turbocharger and engine to accelerate. The "throttle" switch 170 may be provided with a dashpot operator so that the "throttle" switch is closed only if the vehicle gas pedal or throttle is moved rapidly.

A rotor speed sensor 174 for the turbocharger 162, which may be located in an assisting internal electric motor 164 in the turbocharger, can provide a turbocharger speed signal 174a to control 182, which can act to de-energize both energy sources 168, 172 when the turbocharger rotor speed reaches a predetermined maximum speed, such as that corresponding to the boost pressure limit. Anytime the rotor speed falls below the predetermined minimum level, the rotor speed sensor 174 sends a speed signal 174a to the control means 182 to close the motor's continuous energizing circuit 168 to maintain the rotor speed at the predetermined minimum level in preparation for the next acceleration of the engine 160. During operation of the engine 160, a charge air flow is directed from the turbocharger 162 through an air intake system 176 to be introduced to the engine cylinders 178 via intake valve 188. If desired, in addition or in the alternative, one or more engine operating signals 165 may be provided to control 182 to effect such operations.

In operation, where an internal combustion engine rating is such that an excess of exhaust gas energy is available in the medium to high engine speed range, the motor-generator 164 in the motor-assisted turbocharger 162 will be operating at a speed high enough to generate an electric current. In this case, the current can be fed back through controller 182 to recharge either energy source 168, 172 which can be, for example, the battery or batteries for the internal combustion engine or vehicle. If the batteries are fully charged, the controller 182 can be programmed to divert the electric current to other accessories or a current dissipating resistance 190 by switch 192 to provide turbocharger rotor braking.

In the motor-assisted turbocharger 142, 162 used with either a two-cycle or four-cycle engine 140, 160, the assisting motor can be provided with an internal temperature sensor (not shown) to act as a protection device by signalling the controller 144, 182 to de-energize the assisting motor if the internal temperature exceeds a predetermined safe value.

For those applications where it may be desirable to monitor the speed of the turbocharger rotor, a digital read-out display (not shown) can be provided from the motor or control and displayed at a convenient location for observation at any time during operation of the engine.

Thus, systems of the present invention serve plural functions: to serve in an assisting mode to assist an internal combustion engine at low engine speeds and during acceleration and to act as a brake on the turbocharger rotor at medium to high engine speeds. The assisted motor-generator can act in a generator mode as an electrical generator at high engine speeds and loads, in conjunction with a controller which can regulate the current fed to a battery charging circuit and, when the electrical storage batteries are fully charged, to divert excess current to other uses or to a current dissipating resistance.

Although certain preferred embodiments of the invention have been described herein, it will be apparent to those skilled in the art to which the invention pertains that variations and modifications of the described embodiments may be made without departing from the spirit and scope of the invention. Accordingly, it is intended that the invention be limited only to the extent required by the appended claims and applicable rules of law.

We claim:

1. A turbocharging system for use with an internal combustion engine operated by an accelerator pedal, comprising:
    a turbocharger including a rotor with an exhaust gas turbine for receiving an exhaust gas flow from the internal combustion engine and a turbine-driven compressor for providing compressed air to the internal combustion engine and a sensor for providing a signal relating to turbocharger rotor speed;
    an assisting motor-generator for assisting the turbocharger in providing compressed air to the internal combustion engine; and
    a control for controlling said assisting motor-generator and the turbocharger rotor speed, said control comprising a first switch for energizing said motor-generator as a motor to maintain the turbocharger rotor speed at a minimum continuous level, a second switch for super energizing said motor-generator upon the rapid depression of the accelerator pedal, and means responsive to the turbo-charger speed signal to de-energize the motor-generator above a higher turbocharger motor speed.

2. The turbocharging system of claim 1, wherein said control connects said motor-generator to generate electric current above said higher turbocharger rotor speed so as to act as a brake on the turbocharger rotor.

3. The turbocharging system of claim 2, wherein said control connects said motor-generator to generate electric current above said higher turbocharge rotor speed to maintain a substantially constant charge air pressure to the internal combustion engine.

4. The turbocharging system of claim 1 wherein said control energizes said assisting motor-generator between a predetermined minimum turbocharger boost pressure and a predetermined maximum turbocharger boost pressure, and connects said assisting motor generator for generating electric power when an excess of energy exists in the engine exhaust gas.

5. The turbocharging system of claim 1, including an energizing circuit wherein said assisting motor-generator is energized by said control in response to said second switch from said energizing circuit to provide an increased boost pressure during acceleration of the internal combustion engine.

6. The turbocharging system of claim 1, wherein said assisting motor-generator is incorporated within the turbocharger assembly.

7. A method of turbocharging an internal combustion engine, comprising the steps of:
    providing a turbocharger for using exhaust gas energy from the internal combustion engine for producing a compressed combustion air flow;
    providing an electric motor connected for assisting the turbocharger in producing said compressed combustion air flow;
    providing a source of energy for said electric motor capable of operation of the electric motor between a predetermined minimum speed and a predetermined elevated speed;
    operating a first switch means for controlling said source of energy to operate said electric motor at the predetermined minimum speed;
    operating a second switch means for controlling said source of energy to super energize said electric motor;
    determining the electric motor speed; and
    controlling the electric motor in response to the determined electric motor speed by de-energizing the electric motor above a predetermined elevated speed and by re-energizing the electric motor when the electric motor speed falls below the predetermined minimum speed from said source of energy.

8. The turbocharging method of claim 7, comprising the step of controlling said electric motor by maintaining a predetermined elevated operating speed during periods at engine acceleration.

9. The turbocharging method of claim 8, comprising the step of controlling said electric motor by maintaining said predetermined elevated operating speed at about the torque peak of the internal combustion engine.

10. The turbocharging method of claim 9, comprising the step of controlling said electric motor by switching operation of the electric motor from an assisting mode to an electric energy generating mode at about the torque peak of the internal combustion engine.

11. The turbocharging method of claim 10, comprising the step of using generated electric energy for braking the turbocharger at said predetermined elevated turbocharger speed.

12. The turbocharging method of claim 10 comprising the step of directing electric current generated by said electric motor to an electrical system of an internal combustion engine.

13. The turbocharging method of claim 12, comprising the step of directing the electric energy to an electrical storage battery.

14. The turbocharging method of claim 10, comprising the step of directing electric energy generated by said electric motor to a dissipating resistive device for braking the turbocharger rotor.

15. A turbocharging system for use with an internal combustion engine, comprising:
    a turbocharger including a rotor with an exhaust gas turbine for receiving an exhaust gas flow from the internal combustion engine and a turbine-driven compressor for providing compressed air to the internal combustion engine and a sensor for providing a signal relating to turbocharger rotor speed;

a motor-generator for assisting in the rotation of the turbocharger in providing compressed air to the internal combustion engine;

a source of energy for rotating said motor-generator; and a control for controlling said source of energy to said motor-generator consisting essentially of first switch means for controlling said source of energy to maintain operation of said motor-generator at a predetermined minimum speed, second switch means for controlling said source of energy to super-energize said motor-generator and increase its speed of operation, and third means, responsive to said signal relating to turbocharger rotor speed, for deenergizing the motor-generator above a predetermined elevated rotor speed.

16. The turbocharging system of claim 15 wherein said third means connects the motor-generator to provide a braking flow of electric current above a predetermined maximum rotor speed.

17. The turbocharging system of claim 16 wherein said predetermined maximum rotor speed corresponds to a boost pressure limit.

18. The turbocharging system of claim 15 wherein said first switch means comprises an ignition switch.

19. The turbocharging system of claim 15 wherein said first switch means comprises a transmission switch.

20. The turbocharging system of claim 15 wherein said second switch means comprises a throttle switch.

21. The turbocharging system of claim 20 wherein said throttle switch comprises a dash pot-operated accelerator pedal linkage.

* * * * *